United States Patent
Mori et al.

(10) Patent No.: US 10,688,837 B2
(45) Date of Patent: Jun. 23, 2020

(54) TIRE-MOUNTED SENSOR AND SENSOR DEVICE USED FOR SAME

(71) Applicant: DENSO CORPORATION, Kariya, Aichi-pref. (JP)

(72) Inventors: Masashi Mori, Kariya (JP); Takatoshi Sekizawa, Kariya (JP)

(73) Assignee: DENSO CORPORATION, Kariya, Aichi-pref.

( * ) Notice: Subject to any disclaimer, the term of this patent is extended or adjusted under 35 U.S.C. 154(b) by 95 days.

(21) Appl. No.: 15/766,450

(22) PCT Filed: Oct. 4, 2016

(86) PCT No.: PCT/JP2016/079372
§ 371 (c)(1),
(2) Date: Apr. 6, 2018

(87) PCT Pub. No.: WO2017/061397
PCT Pub. Date: Apr. 13, 2017

(65) Prior Publication Data
US 2018/0297424 A1    Oct. 18, 2018

(30) Foreign Application Priority Data
Oct. 8, 2015  (JP) ................................. 2015-200423

(51) Int. Cl.
*B60C 19/00* (2006.01)
*B60C 23/20* (2006.01)
(Continued)

(52) U.S. Cl.
CPC .......... *B60C 23/0493* (2013.01); *B60C 19/00* (2013.01); *B60C 23/0488* (2013.01);
(Continued)

(58) Field of Classification Search
None
See application file for complete search history.

(56) References Cited

U.S. PATENT DOCUMENTS 6,546,982 B1 * 4/2003 Brown ................... B60C 23/04
152/152.1
6,624,748 B1 * 9/2003 Phelan ................ B60C 23/0493
152/152.1
(Continued)

FOREIGN PATENT DOCUMENTS

JP         2002524326 A    8/2002
JP         2003-200723 A   7/2003
(Continued)

*Primary Examiner* — Natalie Huls
*Assistant Examiner* — Jermaine L Jenkins
(74) *Attorney, Agent, or Firm* — Harness, Dickey & Pierce, P.L.C.

(57) ABSTRACT

A tire-mounted sensor fixed to an inner wall of a tire includes: a sensor holding member including a sensor as a built-in sensor for detecting a physical amount applied to the tire and having a sensor terminal being exposed, a base portion as an attachment surface attached to the tire; and a sensor device being detachable from the sensor holding member including a controller receiving an input of a detection result of the sensor and performing signal processing, a transmitter transmitting information according to the detection result of the sensor acquired by the signal processing at the controller, and a terminal inputting the detection result of the sensor to the controller which is being exposed to have an electrical connection to the sensor terminal when the sensor device is attached to the sensor holding member.

6 Claims, 5 Drawing Sheets

(51) Int. Cl.
   *G01L 17/00*   (2006.01)
   *B60C 23/04*   (2006.01)

(52) U.S. Cl.
   CPC .............. *B60C 23/20* (2013.01); *G01L 17/00* (2013.01); *B60C 2019/004* (2013.01)

(56) References Cited

U.S. PATENT DOCUMENTS

| | | | | |
|---|---|---|---|---|
| 6,782,741 B2 * | 8/2004 | Imbert | ................ | B60C 23/0493 152/152.1 |
| 6,860,303 B2 * | 3/2005 | Rensel | .................... | B60C 23/04 152/152.1 |
| 7,328,608 B2 * | 2/2008 | Kashiwai | ............ | B60C 23/0408 73/146 |
| 7,331,367 B2 * | 2/2008 | Koch | ................ | B60C 23/0493 152/152.1 |
| 7,350,407 B2 * | 4/2008 | Shimura | ............. | B60C 23/0408 73/146 |
| 8,336,588 B2 * | 12/2012 | Koch | ................. | B29C 33/0016 152/152.1 |
| 8,430,142 B2 * | 4/2013 | Incavo | ................ | B60C 23/0493 152/152.1 |
| 8,742,265 B2 * | 6/2014 | Weston | ................ | B60C 23/0411 174/260 |
| 9,016,118 B2 * | 4/2015 | Townsend | ........... | B60C 23/0493 73/146.5 |
| 9,987,889 B2 * | 6/2018 | Nagaya | ................ | B60C 23/0493 |
| 2003/0126918 A1 | 7/2003 | Chuang et al. | | |
| 2006/0038670 A1 | 2/2006 | Kashiwai et al. | | |
| 2007/0175554 A1 | 8/2007 | Bertrand | | |

FOREIGN PATENT DOCUMENTS

| | | |
|---|---|---|
| JP | 2003205716 A | 7/2003 |
| JP | 2006056356 A | 3/2006 |
| JP | 2006240598 A | 9/2006 |
| JP | 2007062405 A | 3/2007 |
| JP | 2009018607 A | 1/2009 |
| JP | 5020618 B2 | 9/2012 |
| JP | 2014178268 A | 9/2014 |
| WO | WO-2013013325 A1 | 1/2013 |

* cited by examiner

TIRE-MOUNTED SENSOR AND SENSOR DEVICE USED FOR SAME

CROSS REFERENCE TO RELATED APPLICATIONS

This application is a U.S. National Phase Application under 35 U.S.C. 371 of International Application No. PCT/JP2016/079372 filed on Oct. 4, 2016 and published in Japanese as WO 2017/061397 A1 on Apr. 13, 2017. This application is based on and claims the benefit of priority from Japanese Patent Application No. 2015-200423 filed on Oct. 8, 2015. The entire disclosures of all of the above applications are incorporated herein by reference.

TECHNICAL FIELD

The present disclosure relates to a tire-mounted sensor arranged inside a tire, and a sensor device used for the tire-mounted sensor.

BACKGROUND ART

A tire-mounted sensor, which is configured to install a tire pneumatic pressure sensor or the like inside a tire, for example, at the rear surface of the tire's tread, has been proposed for replacing a tire pneumatic pressure sensor attached at a vehicle's wheel (see Patent Literature 1).

PRIOR ART LITERATURES

Patent Literature

Patent Literature 1: JP 5020618 B2

SUMMARY

However, a tire-mounted sensor is fixed by, for example, adhesion inside a tire, therefore, the tire-mounted sensor is also disposed at the same time when the tire is disposed. Hence, reuse of the tire-mounted sensor cannot be done.

Accordingly, in view of the above difficulties, it has been reviewed that a sensor holding member is fixed to a tire while the tire-mounted sensor mounted on the sensor holding member is replaceable. When the tire-mounted sensor is configured to be replaceable, the tire-mounted sensor is mounted through the sensor holding member. Therefore, the distance between the tire's inner wall surface and the tire-mounted sensor gets longer. Hence, it is confirmed that the sensitivity of a sensor included in the tire-mounted sensor, for example, an acceleration sensor (hereinafter referred to as a G sensor) or a temperature sensor gets lower.

It is an object of the present disclosure to provide a tire-mounted sensor, which is configured to be replaceable and to suppress lowering of the sensitivity of the sensor.

A tire-mounted sensor according to a first aspect of the present disclosure is configured to be fixed to an inner wall of a tire. The tire-mounted sensor includes: a sensor holding member that has a sensor configured as a built-in sensor to detect a physical amount applied to the tire, a base portion with an attachment surface to be attached to the tire, and a terminal of the sensor being exposed; and a sensor device that is configured to be detachable from the sensor holding member, and that includes a controller configured to receive an input of a detection result of the sensor and carrying out signal processing, a transmitter configured to transmit information according to the detection result of the sensor which is acquired by the signal processing carried out at the controller, and a terminal, which is configured to input the detection result of the sensor to the controller, that is exposed to have an electrical connection to the sensor terminal when the sensor device is attached to the sensor holding member.

As described above, since it is possible to remove the sensor device from the sensor holding member, the sensor device is detachable from the sensor holding member. The sensor device can be removed and be utilized again when, for example, a tire is replaced by another tire; and only the sensor holding member in the sensor-mounted sensor is disposed. Even if the sensor holding member is disposed, a variety of functional devices in the tire-mounted sensor are mostly integrated in the sensor device; therefore, the sensor device can be reutilized mostly. Accordingly, it is effective to keep only the sensor device as it can be reutilized mostly. With regard to the sensor, it is not arranged at the sensor device in the tire-mounted sensor, but it is arranged at the sensor holding member which is closed to each of the tires. Therefore, it is possible to suppress in lowering sensitivity of the sensor.

A sensor device according to a second aspect of the present disclosure is configured to be detachable from a sensor holding member included in a tire-mounted sensor fixed to an inner wall surface of a tire. The sensor device includes: a controller that is configured to receive an input of a detection result of a sensor included in the sensor holding member and carries out signal processing, a transmitter that is configured to transmit information according to the detection result of the sensor which is acquired by the signal processing carried out at the controller, and a terminal, which is configured to input the detection result of the built-in sensor to the controller, that is exposed to have an electrical connection to the sensor terminal when the sensor device is attached to the sensor holding member.

According to the above-mentioned configuration, the sensor device is removable and it can suppress a decrease in the sensor's sensitivity.

BRIEF DESCRIPTION OF DRAWINGS

The above and other objects, features and advantages of the present disclosure will become more apparent from the following detailed description made with reference to the accompanying drawings. In the drawings.

EMBODIMENTS

The following describes an embodiment of the present disclosure in reference to drawings. It is noted that the same reference numeral is assigned to the parts, which are identical or equivalent, in the following respective embodiments.

First Embodiment

The following describes a tire pneumatic detector having a tire-mounted sensor, and a vehicular controller according to the present embodiment with reference to FIGS. 1 to 9. The tire pneumatic detector and the vehicular controller according to the present embodiment are used for, for example, detecting a decrease in tire pneumatic pressure or a travelling road surface condition (hereinafter referred to as road surface condition) based on the detection data transmitted from the tire-mounted sensor included in each wheel of a vehicle.

Figure 1:
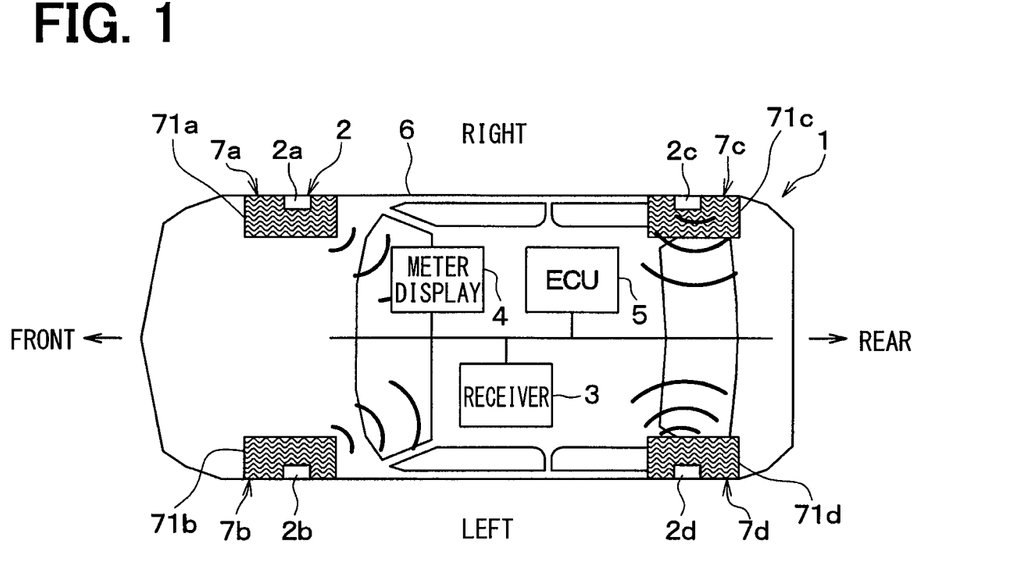
FIG. 1 illustrates a block configuration of a vehicle in which a tire-mounted sensor according to a first embodiment is applied.

As illustrated in FIG. 1, a vehicle 1 includes a tire-mounted sensor 2, a receiver 3, a meter display 4 and an electronic controller 5 (hereinafter referred to as ECU) for controlling the vehicle. The tire pneumatic detector is configured by the tire-mounted sensor 2, the receiver 3 and the meter display 4. Additionally, the vehicular controller is configured by the tire-mounted sensor 2, the receiver 3 and the ECU 5.

Figure 2:
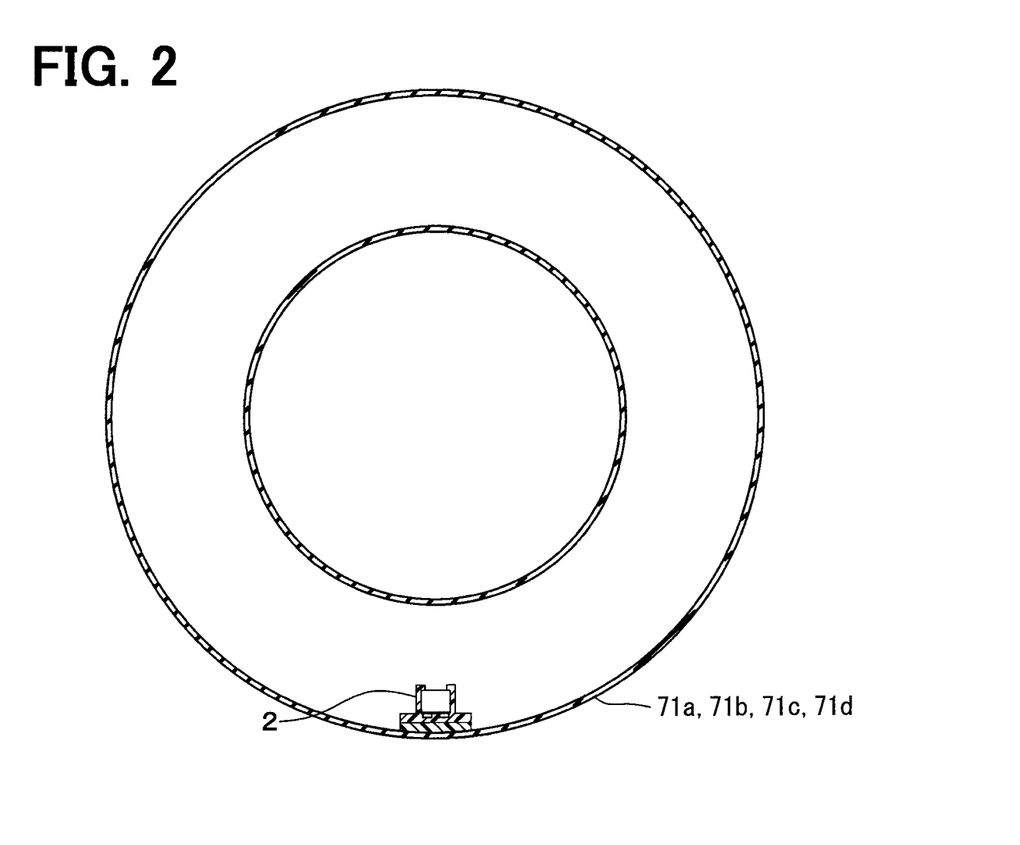
FIG. 2 is a cross-section view that illustrates an installation state of the tire-mounted sensor to a tire.

As illustrated in FIGS. 1 and 2, the tire-mounted sensor 2 is attached at each of tires 71a to 71d at respective wheels 7a to 7d of the vehicle 1. The receiver 3, the meter display 4 and the ECU 5 are attached at a vehicle body 6 side of the vehicle 1, and a variety of devices are connected through, for example, a vehicle LAN (Local Area Network) carried out by, for example, CAN (Controller Area Network) communication so as to carry out mutual information exchange.

The tired mounted sensor 2 detects pneumatic pressure of each of the tires 71a to 71d respectively attached at the wheels 7a to 7d, and detects various information related to the tires 71a to 71d and stores each kind of information having information related to tire pneumatic pressure into a frame and then transmits the frame. In FIG. 1, the tire-mounted sensors 2 attached at respective wheels 7a to 7d are indicated as 2a to 2d. The tire-mounted sensors 2a to 2d are configured similarly. The receiver 3 receives a frame transmitted from the tire-mounted sensor 2 and carry out tire pneumatic pressure detection or road surface condition detection through, for example, a variety of processes or computation based on a detection signal stored in the frame. The following describes the detail of the tire-mounted sensor 2 with reference to FIGS. 3 to 7.

As illustrated in FIGS. 3 to 7, the tire-mounted sensor 2 includes a sensor holding member 21 and a sensor device 22.

Figure 3:
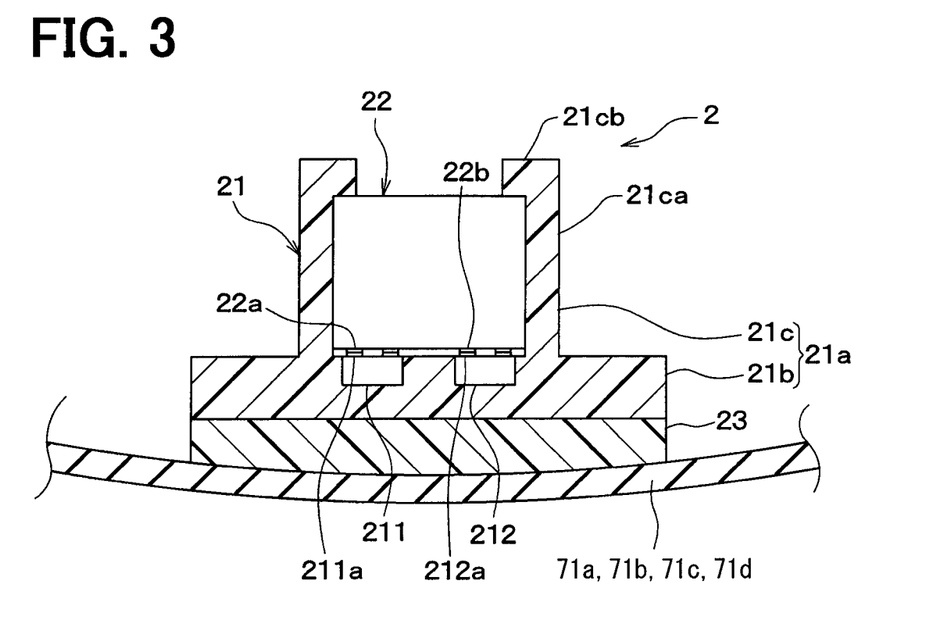
FIG. 3 is an enlarged view of the tire-mounted sensor in FIG. 2.

The sensor holding member 21, as illustrated in FIGS. 2 and 3, holds the sensor device 22 at the inner surface of each of the tires 71a to 71d, for example, at the rear surface of the tread. The sensor holding member 21 includes a G-sensor 211 and a temperature sensor 212, which correspond to a sensor.

Figure 4:
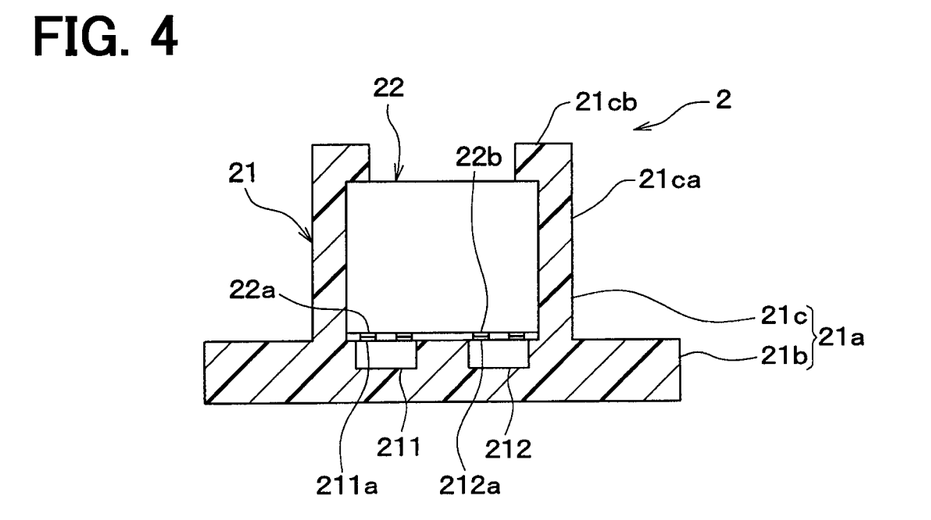
FIG. 4 is an enlarge view of the tire-mounted sensor.
Figure 5:
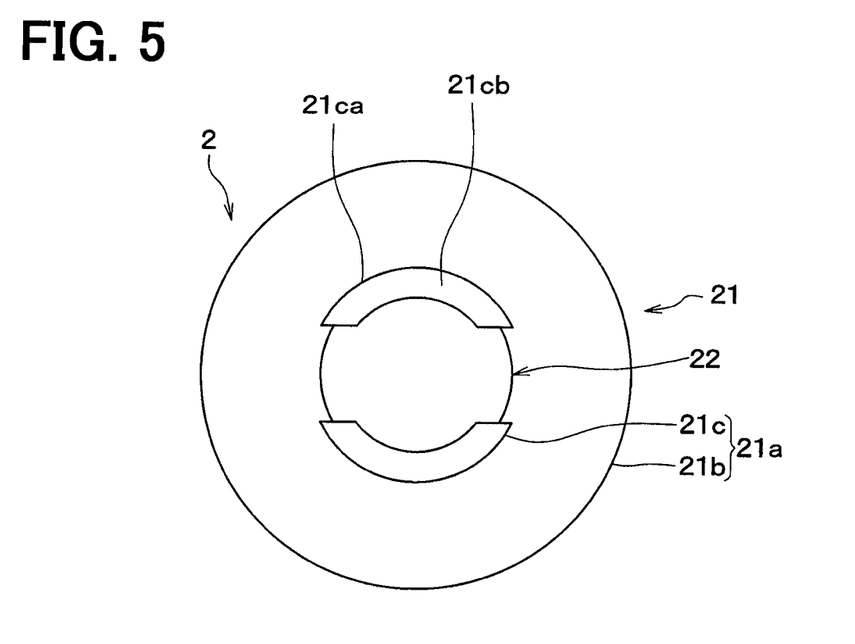
FIG. 5 is a top view of the tire-mounted sensor.
Figure 7:
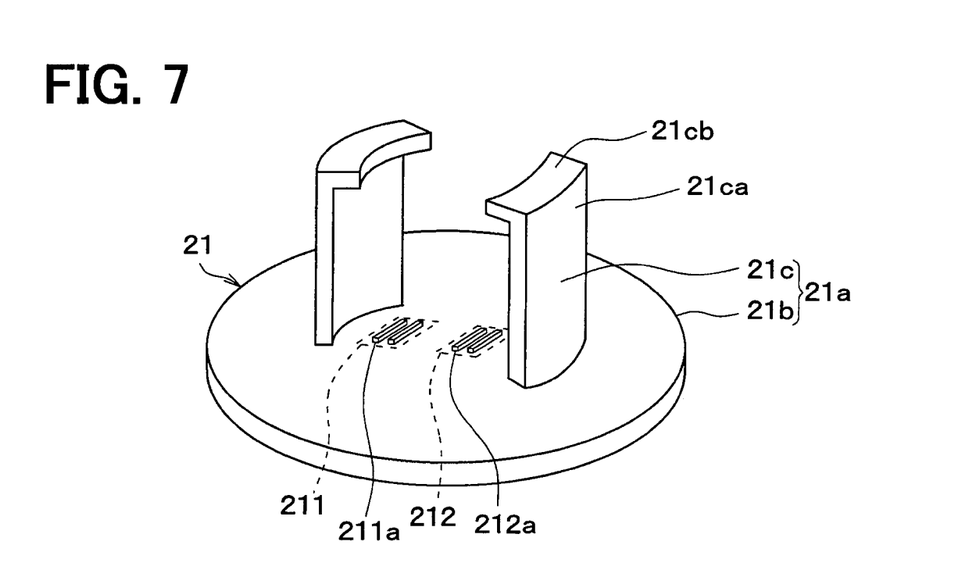
FIG. 7 is a perspective view of a sensor holding member.

In the present embodiment, as shown in FIGS. 3, 4 and 7, the sensor holding member 21 includes the G-sensor 211 and the temperature sensor 212 at a desired position of a resin member 21a. For example, the sensor holding member 21 is configured such that the G-sensor 211 and the temperature sensor 212 are insert molded; or alternatively, the G-sensor 211 and the temperature sensor 212 are fit into installation hole (not shown) of the resin member 21a, which is molded by resin.

The resin member 21a includes a base portion 21b, which is formed in a sheet shape, and a holding sheet 21c protruded from the base portion 21b.

The base portion 21b includes a front surface and a rear surface, and is fixed by sticking the rear surface to the inner wall surface, as an installation surface, of each of the tires 71a to 71d. In this embodiment, the base portion 21b is formed in a circular plate shape; however, it may also be formed in another kind of shape such as a rectangular plate shape. Or alternatively, the base portion 21b may also be formed into another shape, which is different from a plate shape. The G-sensor 211 and the temperature sensor 212 are configured such that at least the terminals 211a, 212a are exposed from the front surface of the base portion 21b, and the terminals 211a, 212a are electrically connected to the terminals 22a, 22b included in the sensor device 22.

The holding plate 21c is protruded from the front surface side of the base portion 21b to the opposite side of the rear surface as the installation surface of the base portion 21b. The holding plate 21c is provided in several pieces at separate positions for holding the terminals 22a, 22b. In this embodiment, two pieces are provided. Each holding plate 21c includes: a sidewall 21ca having an upper surface shape formed into an circuit arc; and a locking portion 21cb provided at the tip, which is opposite to the base portion 21b and is projected to the inner side of another holding plate 21c. The resin member 21a is configured by the above-mentioned configuration, and the sensor device 22 is arranged inside space surrounded by the base portion 21b and the holding plate 21c. The space is configured to be in a shape corresponding to the shape of the sensor device 22. In this embodiment, the space is formed into a cylindrical shape.

The G-sensor 211 outputs a detection signal corresponding to acceleration. In this embodiment, the G-sensor 211 is arranged to detect acceleration according to the ground-contact state of each of the wheels 7a to 7d and to detect acceleration in a radial direction of each of the wheels 7a to 7d. However, the G-sensor 211 may be arranged to detect acceleration in a tangential direction of each of the wheels 7a to 7d. The acceleration largely changes when the portion of each of the tires 71a to 71d at which the G-sensor 211 is attached has a ground-contact with a road surface and then moves away from the road surface. In addition, the acceleration changes when having a vibration according to the road surface condition at the time of ground-contact. These accelerations are indicated as a detection signal of the G-sensor 211.

The temperature sensor 212 outputs a detection signal according to temperature. Thus, the temperature sensor 212 measures the temperature of each of the tires 71a to 71d or the temperature of the road surface by detecting the temperature of the installation position of the tire-mounted sensor 2 in each of the tires 71a to 71d.

Figure 6:
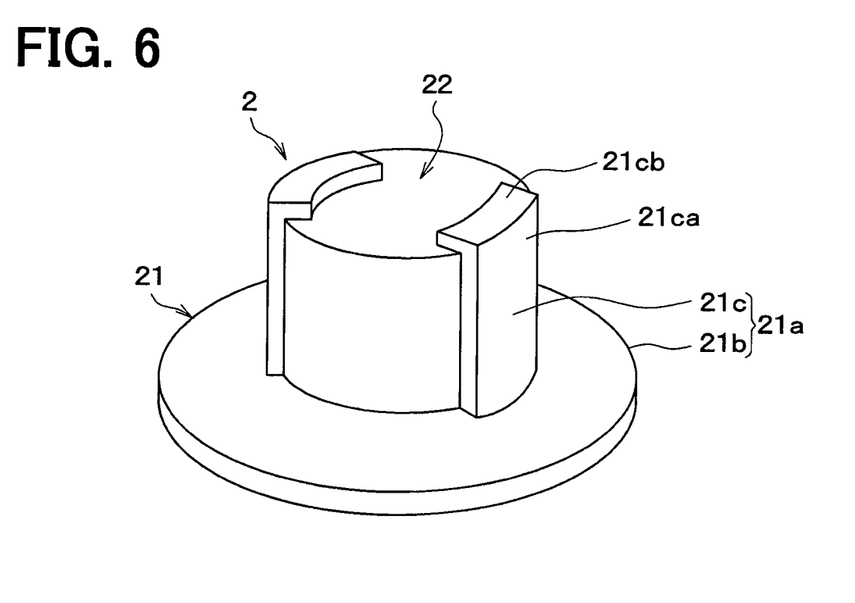
FIG. 6 is a perspective view of the tire-mounted sensor.

As illustrated in FIGS. 3 to 6, the sensor device 22 is arranged in space configured by the base portion 21b and the holding plate 21c of the sensor holding member 21. In this embodiment, as illustrated in FIG. 6, the sensor device 22 has an outer shape formed into a cylindrical shape. As illustrated in FIG. 3, the terminals 22a, 22b are exposed from the base portion. Accordingly, the bottom surface of the sensor 22 is in contact with the base portion 21b and the upper surface of the sensor device 22 is in contact with locking portion 21cb, and the sensor device 22 is held between the base portion 21b and the locking portion 21cb. Additionally, the side surface of the sensor device 22 is in contact with the inner wall surface of the holding plate 21c. Accordingly, the sensor device 22 is in contact with the sensor holding member 21 at the side surface in addition to the upper surface and the bottom surface of the sensor device 22. Therefore, the sensor device 22 is held at the sensor holding member 21 without position aberration.

Figure 8:
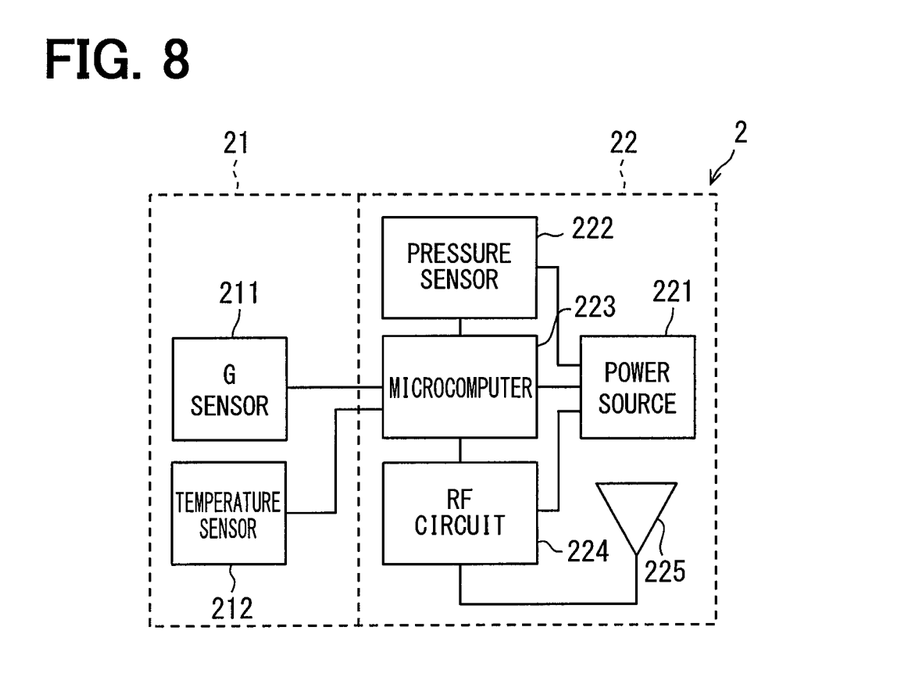
FIG. 8 illustrates a block configuration of the tire-mounted sensor.

As illustrated in FIG. 8, the sensor device 22 includes a power source 221, a pressure sensor 222, a microcomputer 223, an RF circuit 224 and an antenna 225; and the sensor device 22 is covered by resin.

The power source 221 is configured, for example, a battery; however, the power source 221 may also receive power through an electrical generator or a transponder. The pressure sensor 222, the microcomputer 223 and the RF circuit 224 are in operation when receive power from the power source 221.

The pressure sensor 222 is configured by, for example, a diaphragm form, and is configured to output a detection signal based on the tire pneumatic pressure. It is noted that the installation position of the pressure sensor 222 is arbitrarily. In this embodiment, the pressure sensor 222 is placed at the central portion of the upper surface of the sensor holding member 21 and is exposed from the resin portion while being exposed from the place between the locking portions 21cb of both holding plates 21c. Accordingly, when the place between the locking portions 21cb of the both holding plates 21c is configured as the pressure inlet, the pneumatic pressure inside each of the tires 71a to 71d is applied to the pressure sensor 222.

The microcomputer 223 is known to have, for example, a CPU, an ROM, an RAM and an I/O. The microcomputer 223 executes a predetermined process in accordance with a program stored in, for example, the ROM. In the ROM, an individual piece of ID information has: identification information in the transmitter for identifying the tire-mounted sensor 2; and identification information included in a vehicle for identifying the vehicle itself.

The microcomputer 223 receives a detection signal from the G-sensor 221, the temperature sensor 212 and the pressure sensor 222, and performs signal processing on the detection signal and processes the signal if necessary, and creates information related to acceleration, temperature and tire pneumatic pressure. Subsequently, the microcomputer 223 stores each kind of information into a frame with ID information of each tire-mounted sensor 2. In addition, the microcomputer 223 creates a frame and then transmits the frame to the RF circuit 224.

The RF circuit 224 includes a transmitter, and is configured to transmit the frame transmitted from the microcomputer 223 to the receiver 3 through the antenna 225. In this embodiment, since a signal in an RF region is utilized, the RF circuit 224 is utilized as the transmitter. However, a signal in a region other than the RF region can also be utilized.

The pressure sensor 222, the microcomputer 223, the RF circuit 224 and the antenna 225 is configured by, for example, one chip having a semiconductor integrated circuit. The pressure sensor 222 and the power source 221 are covered by the resin portion, and the outer shape of the sensor device 22 in an integrated state is formed in a cylindrical shape. For example, the resin portion is formed by resin molding, and is formed by insert molding so as to make the pressure receiver of the pressure sensor 222 in each sensor device to be exposed.

The tire-mounted sensor 2 as described above is configured, for example, by expanding space between the both holding plates 21c of the sensor holding members 21 through elastic deformation and arranging the sensor device 22 into the space surrounded by the sensor holding member 21. In this situation, an adhesive agent 23 is coated at the rear surface side of the base portion 21b of the sensor holding member 21, and the tire-mounted sensor 2 is stick on the inner wall surface of each of the tires 71a to 71d, for example, the rear surface of the tread. Thus, the tire-mounted sensor 2 is attached inside the each of the tires 71a to 71d.

Since the tire-mounted sensor 2 configured as described above only holds the sensor device 22 with the sensor holding member 21, it is possible to remove the sensor device 22 from the sensor holding member 21. In other words, it is possible to remove the sensor device 22 from the sensor holding member 21 by expanding the holding plate 21c.

Thus, it is possible to detach the sensor device 22 from the sensor holding member 21. Accordingly, for example, in a situation where a tire is required to be changed, the sensor device 22 can be removed from the sensor holding member 21 and then can be reused, and only the sensor holding member 21 as a part of the tire-mounted sensor 2 can be disposed.

Figure 9:
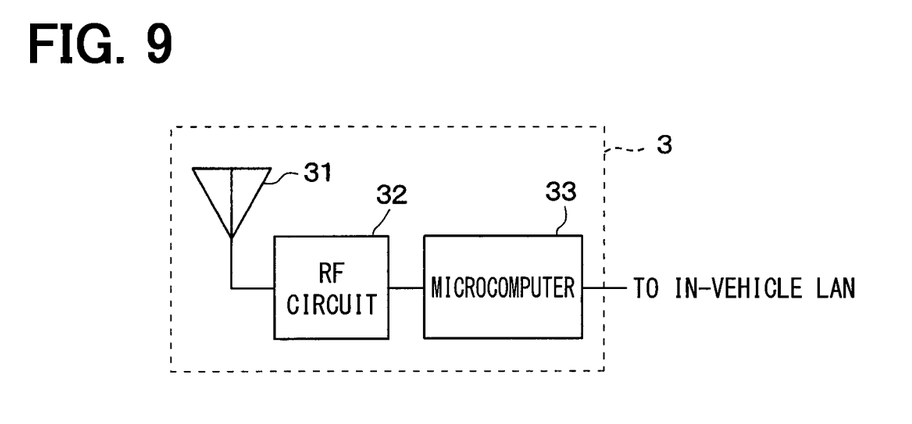
FIG. 9 illustrates a block configuration of a receiver.

As illustrated in FIG. 9, the receiver 3 includes, for example, an antenna 31, and RF circuit 32, and a microcomputer 33.

The antenna 31 receives a frame, which is transmitted from each tire-mounted sensor 2. The antenna 31 is fixed to the vehicle body 6.

The RF circuit 32 receives an input of the frame transmitted from each tire-mounted sensor 2 through the antenna 31, and operates as a receiver circuit by sending the frame to the microcomputer 33.

The microcomputer 33 is known to include, for example, a CPU, and ROM, an RAM, and I/O, and is configured to execute tire pneumatic pressure detection process according to a program stored in the ROM or the like and execute road surface condition detection process. For example, the microcomputer 33 stores ID information of each tire-mounted sensor 2 in association with the position of each of the wheels 7a to 7d where each tire-mounted sensor 2 is attached. The microcomputer 33 detects tire pneumatic pressure in each of the wheels 7a to 7d based on information related to the ID information and tire pneumatic pressure stored in the frame sent from each tire-mounted sensor. Additionally, the microcomputer 33 detects the road surface condition based on the information related to acceleration or temperature stored in the frame sent from each tire-mounted sensor 2.

For example, the microcomputer 33 compares the tire pneumatic pressure stored in the frame to a predetermined pressure threshold value, and determines whether the tire pneumatic pressure is at reasonable pressure. If the tire pneumatic pressure is lower than pressure threshold value, the microcomputer 33 outputs a signal, which indicates this situation. Or alternatively, the microcomputer 33 outputs a signal, which indicates an absolute value of the tire pneumatic pressure stored in the frame, to the meter display 4. It is noted that the microcomputer 33 may correct the tire pneumatic pressure indicated by the information stored in the frame based on the temperature, and then utilize the corrected tire pneumatic pressure as the actual tire pneumatic pressure.

The microcomputer 33 detects the road surface condition based on the acceleration or temperature stored in the frame. For example, the waveform of the acceleration reaches a maximum value at the timing of starting ground-contact during which the part corresponding to the installation position of the tire-mounted sensor 2 included in the tread starts to have a contact with the ground along with the rotation of each of the tires 71a to 71d. Moreover, the waveform of the acceleration reaches a minimum value at the timing of completing ground-contact during which the part corresponding to the installation position of the tire-mounted sensor 2 included in the tread does not have a ground-contact anymore from the situation of having ground-contact. The waveform between the maximum value and the minimum value is regarded as a ground-contact zone, and the waveform of the acceleration in the ground-contact zone corresponds to the road surface condition.

The waveform of the acceleration varies in a situation, for example, when a vehicle runs on a road surface such as an asphalt road having a friction coefficient (hereinafter referred to as p) with a relatively higher value p; or when the vehicle runs on a road surface such as a frozen road having lower value of p. In other words, with the influence of road surface having p, a finer high-frequency vibration caused by slipping of the tires 71a to 71d overlaps with an output voltage when the vehicle runs on the road surface having lower $\mu$. Accordingly, in respective situations when the vehicle runs on a road surface with higher p and when the vehicle runs on a road surface with lower $\mu$, the frequency analysis is carried out on the waveform of the acceleration in the ground-contact zone, and the level of high-frequency component varies based on the road surface condition. In particular, the situation of running on a road surface with lower $\mu$ has a higher level in high-frequency component compared with the situation of running on a road surface with higher $\mu$. Accordingly, the level in higher-frequency component of the waveform of the acceleration indicates the road surface condition, and the road surface with $\mu$ can be detected based on the indication.

Although the road surface with $\mu$ is described above, the waveform of acceleration may also vary according to, for example, running on a dry road surface or a wet road surface. Therefore, the road surface condition may be detected by, for example, the frequency analysis on the waveform of acceleration.

Thus, the road surface such as having p, wet surface or dry surface can be detected based on the waveform of acceleration.

In addition, a temperature of each of the tires 71a to 71d can be detected based on the temperature information stored in a frame, and then the temperature of a road surface can be detected base on the temperature. With regard to the temperature of tires 71a to 71d or the temperature of a road surface, the heat conducting method from the tires 71a to 71d or a road surface to the sensor holding member 21 can be estimated in advance, and then the temperature of tires 71a to 71d or the temperature of a road surface can be acquired based on the estimated data and the temperature information stored in the frame. For example, a map or an approximate functional equation is created based on estimated data, and then the map or the approximate functional equation is stored in the microcomputer 33. Thus, the temperature of the tires 71a to 71d or road surface can be acquired based on the temperature information included in the frame and the map or the approximate functional equation.

The meter display 4 acts as an alarm that is configured to be placed at a position which can be visually recognized by a driver as illustrated in FIG. 1. For example, the meter display 4 is arranged within an instrumental panel of the vehicle 1. When a signal indicative of a decrease in tire pneumatic pressure is transmitted from, for example, the microcomputer 33 in the receiver 3, this meter display 4 notifies of a decrease in tire pneumatic pressure to the driver by displaying the information.

The ECU 5 acquires information related to road surface, in other words, information related to the road surface with $\mu$ or the temperature of the road surface from the receiver 3 to execute a vehicular control. For example, a brake ECU is configured as the ECU 5. When the brake ECU is configured as the ECU 5, the ECU 5 utilizes the obtained p of the road surface to carry out, for example, an anti-lock braking control or a sideslip prevention control. For example, in a situation of running on the frozen road or the like, the control such as wheel-slip suppression may be carried out, when a braking force generated relative to a brake operation amount by the driver becomes weaker as compared to the situation of running on the asphalt road or the like.

In a situation where a vehicle external communication may be carried out by using a communication device (not shown) such as a navigation ECU configured as the ECU 5, the road surface condition can also be informed to a communication center through road-to-vehicle communication. In this situation, the communication center generates a map based on the information of road surface condition, and notifies of the information to, for example the following vehicle. Similarly, the information of road surface condition may be transmitted to the direct following vehicle through inter-vehicle communication. Thus, the following vehicle may grasp the road surface condition in advance to perform vehicular control so as to enhance the safety of vehicle travel.

The tire pneumatic pressure detector including the tire-mounted sensor 2 according to the present embodiment or the vehicular controller is configured as described above.

As described above, since the tire-mounted sensor 2 according to the present embodiment only holds the sensor device 22 relative to the sensor holding member 21 so that it is possible to remove the sensor device 22 from the sensor holding member 21. Since the sensor device 22 is detachable from the sensor holding member 21, the sensor device 22 can be removed and be utilized again when, for example, a tire is replaced by another tire; and only the sensor holding member 21 in the sensor-mounted sensor 2 is disposed. Even if the sensor holding member 21 is disposed, a variety of functional devices in the tire-mounted sensor 2 are mostly integrated in the sensor device 22; therefore, the sensor device 22 can be reutilized mostly. Accordingly, it is effective to keep only the sensor device 22 as it can be reutilized mostly.

With regard to the G-sensor 211 or the temperature sensor 212, it is not arranged at the sensor device 22 in the tire-mounted sensor 2, but it is arranged at the sensor holding member 21 which is closed to each of the tires 71a to 71d. Accordingly, the vibration or temperature of each of the tires 71a to 71d mostly is conducted to the G-sensor 211 or the temperature sensor 212. Therefore, it is possible to suppress in lowering sensitivity of the G-sensor 211 or the temperature sensor 212.

As described above, the tire-mounted sensor 2 is configured to be replaceable. Additionally, the tire-mounted sensor 2 is configured to suppress lowering the sensitivity of the sensor.

OTHER EMBODIMENTS

The present disclosure is not only limited to the above embodiments, but it may also be suitably modified within the scope of the present disclosure.

For example, in the present embodiment, both of the G-sensor 211 and the temperature sensor 212 are included in the sensor holding member 21. However, only one of the G-sensor 211 and the temperature sensor 212 may be included in the sensor holding member 21. In addition, the G-sensor 211 and the temperature sensor 212 may be configured separately; in other words, the G-sensor 211 and the temperature sensor 212 may be configured into two chips. However, both can be configured into an integrated manner. A vibration detector or the like can replace the G-sensor 211 that can detect acceleration when the vibration detector is configured to detect the vibration of each of the tires 71a to 71d. In this situation, if the vibration detector is configured to generate electricity, the power source 221 may also be used. In other words, if a sensor detects a physical amount such as vibration or temperature applied to the tires 71a to 71d or a physical amount related to the road surface condition related to the tires 71a to 71d, any kind of sensors cam be included in the sensor holding member 21.

Although the tire-mounted sensor 2 is configured to include the pressure sensor 222, it is not required to include the pressure sensor 222.

Moreover, as long as the sensor device 22 is configured to be detachable and does not fall away due to the rotation of the tires 71a to 71d, the structure of the sensor device 22 or the sensor holding member 21 can be configured arbitrarily. For example, the sensor device 22 may be configured into a rectangular parallelepiped shape or other polygonal prism shape other than the cylindrical shape.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A tire-mounted sensor configured to be fixed to an inner wall of a tire, the tire-mounted sensor comprising:
   a sensor holding member that includes
      a sensor that is configured as a built-in sensor to detect a physical amount applied to the tire, and that has a sensor terminal being exposed, and
      a base portion that has an attachment surface to be attached to the tire; and
   a sensor device that is configured to be detachable from the sensor holding member, and that includes
      a controller that is configured to receive an input of a detection result of the sensor and to carry out signal processing,
      a transmitter that is configured to transmit information according to the detection result of the sensor which is acquired by the signal processing carried out at the controller, and
      a terminal, which is configured to input the detection result of the sensor to the controller, that is exposed to have an electrical connection to the sensor terminal included in the sensor holding member when the sensor device is attached to the sensor holding member.

2. The tire-mounted sensor according to claim 1,
wherein the sensor holding member includes
   the base portion having the attachment surface, and
   a plurality of holding plates protruded from the base portion to an opposite side of the attachment surface,
wherein the sensor terminal is exposed from a front surface of the base portion,
wherein the sensor terminal is interposed between the plurality of holding plates, and
wherein the sensor device is held between the plurality of holding plates.

3. The tire-mounted sensor according to claim 2,
wherein each of the plurality of holding plate includes:
   a side wall that is protruded from the base portion to an opposite side of the attachment surface; and
   a locking portion that is arranged at an end portion of the side wall, the end portion at an opposite side of the base portion, and that projects toward a side where the sensor device is arranged, and
wherein the sensor device is in contact with an inner wall surface of the side wall, and is held between the locking portion and the base portion.

4. The tire-mounted sensor according to claim 1,
wherein the sensor detects a physical amount related to a road surface condition, as a physical amount applied to the tire.

5. The tire-mounted sensor according to claim 1,
wherein the sensor is configured by at least one of an acceleration sensor and a temperature sensor.

6. A sensor device configured to be detachable from a sensor holding member included in a tire-mounted sensor fixed to an inner wall surface of a tire, the sensor device comprising:
   a controller that is configured to receive an input of a detection result of a sensor included in the sensor holding member and to carry out signal processing;
   a transmitter that is configured to transmit information according to the detection result of the sensor which is acquired by the signal processing carried out at the controller; and
   a terminal, which is configured to input the detection result of the sensor to the controller, that is exposed to have an electrical connection to a terminal of the sensor, which is included in the sensor holding member, when the sensor device is attached to the sensor holding member.

\* \* \* \* \*